(12) United States Patent
Lutjen et al.

(10) Patent No.: US 8,529,201 B2
(45) Date of Patent: Sep. 10, 2013

(54) BLADE OUTER AIR SEAL FORMED OF STACKED PANELS

(75) Inventors: Paul M. Lutjen, Kennebunkport, ME (US); Christopher R. Joe, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 1071 days.

(21) Appl. No.: 12/640,033

(22) Filed: Dec. 17, 2009

(65) Prior Publication Data

US 2011/0171011 A1 Jul. 14, 2011

(51) Int. Cl.
*F01D 11/08* (2006.01)
*F01D 25/12* (2006.01)

(52) U.S. Cl.
USPC ..................................... 415/173.1

(58) Field of Classification Search
USPC ............. 415/115, 173.1, 173.3, 173.4, 173.7, 415/174.2; 416/93 R, 96 R
See application file for complete search history.

(56) References Cited

U.S. PATENT DOCUMENTS

| | | | | |
|---|---|---|---|---|
| 3,092,393 A * | 6/1963 | Morley et al. | ................ | 277/414 |
| 3,583,824 A * | 6/1971 | Smuland et al. | ................ | 415/117 |
| 4,021,138 A | 5/1977 | Scalzo et al. | | |
| 4,157,880 A * | 6/1979 | Klompas | ................ | 415/115 |
| 4,307,993 A * | 12/1981 | Hartel | ................ | 415/116 |
| 4,411,594 A * | 10/1983 | Pellow et al. | ................ | 415/173.3 |
| 4,466,772 A | 8/1984 | Okapuu et al. | | |
| 5,791,871 A | 8/1998 | Sech et al. | | |
| 6,048,170 A * | 4/2000 | Dodd | ................ | 415/135 |
| 6,086,329 A | 7/2000 | Tomita et al. | | |
| 6,116,852 A * | 9/2000 | Pierre et al. | ................ | 415/115 |
| 6,315,298 B1 | 11/2001 | Kildea et al. | | |
| 6,393,331 B1 | 5/2002 | Chetta et al. | | |
| 6,488,471 B1 * | 12/2002 | Stibich et al. | ................ | 415/173.3 |
| 6,536,773 B2 * | 3/2003 | Datta | ................ | 277/355 |
| 6,761,534 B1 | 7/2004 | Willett | | |
| 6,884,026 B2 * | 4/2005 | Glynn et al. | ................ | 415/173.1 |
| 6,899,518 B2 * | 5/2005 | Lucas et al. | ................ | 415/116 |
| 6,905,302 B2 | 6/2005 | Lee et al. | | |
| 7,044,709 B2 | 5/2006 | Bruce et al. | | |
| 7,117,983 B2 | 10/2006 | Good et al. | | |
| 7,121,800 B2 | 10/2006 | Beattie | | |
| 7,210,899 B2 * | 5/2007 | Wilson, Jr. | ................ | 415/173.1 |
| 7,306,424 B2 | 12/2007 | Romanov et al. | | |
| 7,371,044 B2 | 5/2008 | Nereim | | |
| 7,494,317 B2 * | 2/2009 | Keller et al. | ................ | 415/136 |
| 7,500,832 B2 | 3/2009 | Zagar et al. | | |
| 7,520,718 B2 | 4/2009 | Engle | | |
| 7,621,719 B2 | 11/2009 | Lutjen et al. | | |
| 2005/0179207 A1 * | 8/2005 | Datta | ................ | 277/350 |
| 2006/0216146 A1 | 9/2006 | Thompson et al. | | |
| 2008/0107521 A1 | 5/2008 | Morrison et al. | | |
| 2008/0159850 A1 | 7/2008 | Tholen et al. | | |
| 2011/0171011 A1 * | 7/2011 | Lutjen et al. | ................ | 415/173.5 |

* cited by examiner

*Primary Examiner* — Edward Look
*Assistant Examiner* — Christopher R Legendre
(74) *Attorney, Agent, or Firm* — Carlson, Gaskey & Olds, PC

(57) ABSTRACT

A blade outer air seal for a gas turbine engine has a plurality of stacked panels extending for at least a part circumferential extent, and extending from a radially outer location to a radially inner location. The plurality of stacked panels are mounted together. A turbine section is also claimed.

16 Claims, 4 Drawing Sheets

BLADE OUTER AIR SEAL FORMED OF STACKED PANELS

BACKGROUND OF THE INVENTION

This application relates to a blade outer air seal for a gas turbine engine, wherein the blade outer air seal is formed of a plurality of stacked panels.

Gas turbine engines are known, and typically include a compressor delivering compressed air into a combustion section. The compressed air is mixed with fuel and combusted in the combustion section. Products of this combustion are delivered downstream over turbine rotors to drive the turbine rotors.

The turbine rotors include removable blades that are formed of complex airfoil designs to most efficiently capture the energy from the products of combustion and translate that energy into rotation. To maximize the efficiency, seals are positioned in close proximity to an outer radial surface of the blades to minimize leakage.

The seals, often known as blade outer air seals (BOAS) are exposed to very high temperatures. Complex cooling schemes are incorporated into the BOAS. Typically, the blade outer air seals have a generally cylindrical inner surface facing the outer surface of the turbine blade, and may have a smooth or grooved sealing surface.

Further, it is often true that thermal barrier materials or coatings are formed on the generally solid BOAS.

SUMMARY OF THE INVENTION

A blade outer air seal for a gas turbine engine has a plurality of stacked panels extending for at least a part circumferential extent, and extending from a radially outer location to a radially inner location. The plurality of stacked panels are mounted together. A turbine section is also claimed.

These and other features of the present invention can be best understood from the following specification and drawings, the following of which is a brief description.

DETAILED DESCRIPTION OF THE PREFERRED EMBODIMENT

Figure 1:
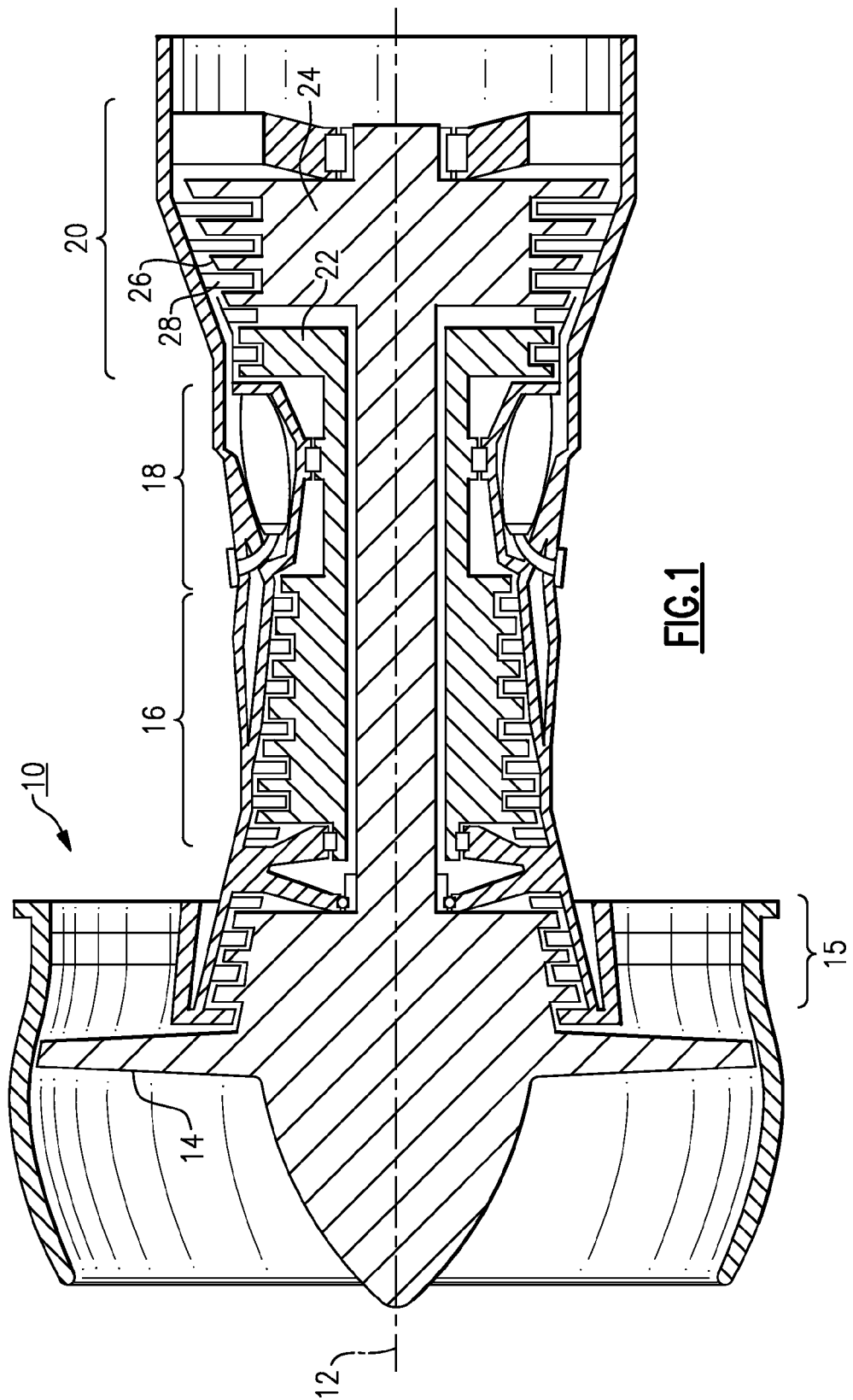
FIG. 1 shows a schematic view of a gas turbine engine.

A gas turbine engine 10, such as a turbofan gas turbine engine, circumferentially disposed about an engine centerline, or axial centerline axis 12 is shown in FIG. 1. The engine 10 includes a fan 14, compressor sections 15 and 16, a combustion section 18 and a turbine 20. As is well known in the art, air compressed in the compressor 15/16 is mixed with fuel and burned in the combustion section 18 and expanded across turbine section 20. The turbine section 20 includes rotors 22 and 24, which rotate in response to the expansion. The turbine section 20 comprises alternating rows of rotary airfoils or blades 26 and static airfoils or vanes 28. In fact, this view is quite schematic, and blades 26 and vanes 28 are actually removable. It should be understood that this view is included simply to provide a basic understanding of the sections in a gas turbine engine, and not to limit the invention. This invention extends to all types of turbine engines for all types of applications. As an example, the engine need not have a fan section.

Figure 2:
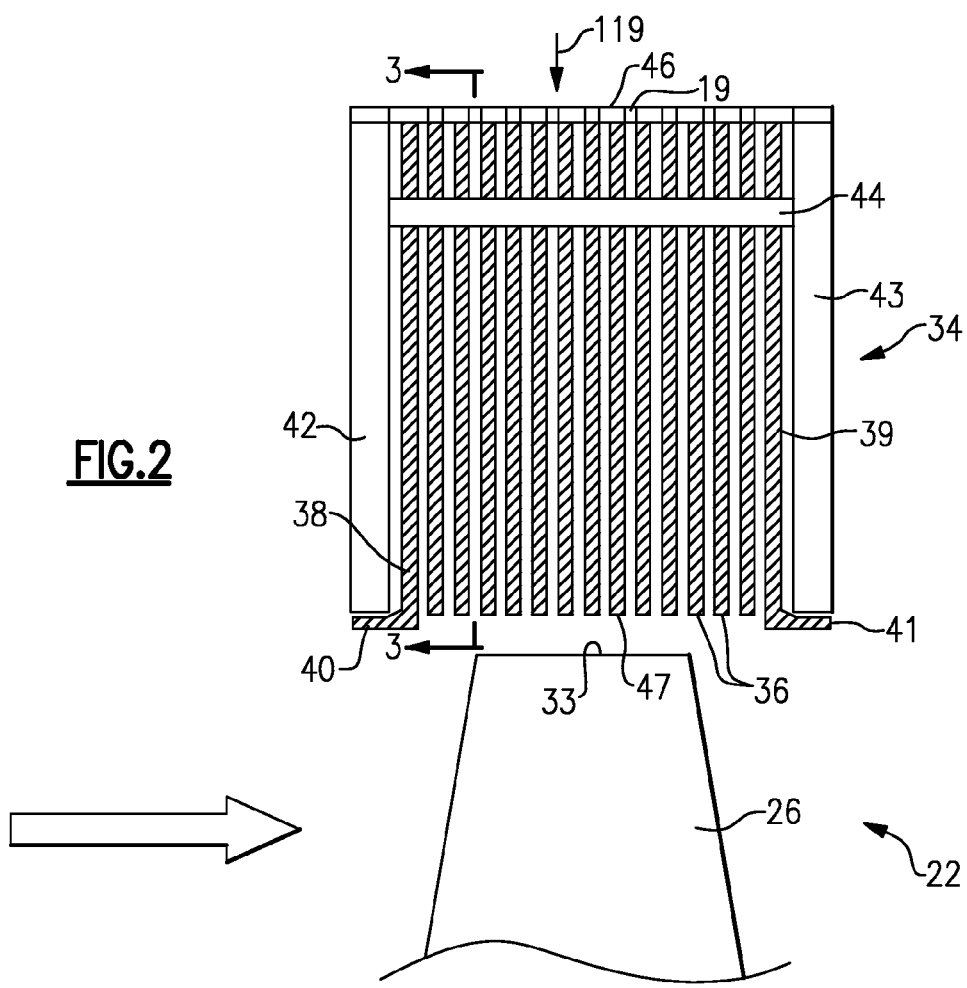
FIG. 2 shows a portion of a gas turbine engine.

FIG. 2 shows a detail of a turbine rotor 22. As shown, a removable blade 26 has a radial outer portion (tip) 33 closely spaced from a blade outer air seal 34. The blade outer air seal 34 is formed of a plurality of stacked panels 36 which extend radially inwardly from an outer metering plate 46 inwardly toward a radially inner end 47 spaced from tip 33. As shown, an upstream panel 38 has a forward foot 40 extending axially beyond a forward frame 42. Similarly, a rearmost panel 39 has a similar rearward foot 41 extending rearwardly beyond a rear frame 43. As can be appreciated, the feet 41 and 40 extend beyond an end of the rear and forward frame facing the plurality of stacked panels, such that they block flow of gases between the frames 42 and 43, and the most adjacent of the stacked panels. In addition, the frames 42 and 43 can be integrally cast, or otherwise fixed to the metering plate 46. The support rails may be attached by welding, brazing, etc. Of course, any other method of attaching these members together can be utilized also.

The panels all have a support hang rail 44 extending through them. In fact, there are a plurality of hang rails spaced circumferentially.

Although unclear from this Figure, the blade outer air seal 34 and each of the panels and frame structures may be a "full hoop" design which completely circumferentially surrounds the turbine rotor. Alternatively, complete circumferential surrounding may be achieved by plural segmented blade outer air seal portions.

The panels 36, 38, and 39 can be formed of monolithic ceramics, Ceramic Matrix Composites (CMCs), or appropriate refractory metals.

The metering plate 46 is shown to have a plurality of holes 19. Holes 19 receive air from a source 119, shown schematically, and deliver air into spaces between the panels 36. This air will provide a positive pressure source resisting leakage, and will also provide some cooling.

Figure 3:
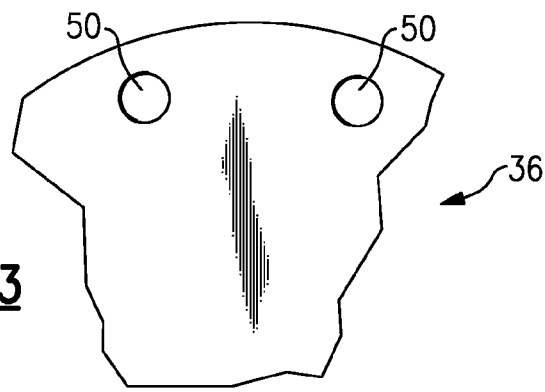
FIG. 3 shows a section along line 3-3 of FIG. 2.

As shown in FIG. 3, the panels 36 have openings 50 such that the hang rail 44 can extend through the panels 36. Panels 38 and 39 have similar openings. While the hang rail openings 50, and hence the rails 44 are shown as circular, any number of other shapes can be utilized.

Figure 4:
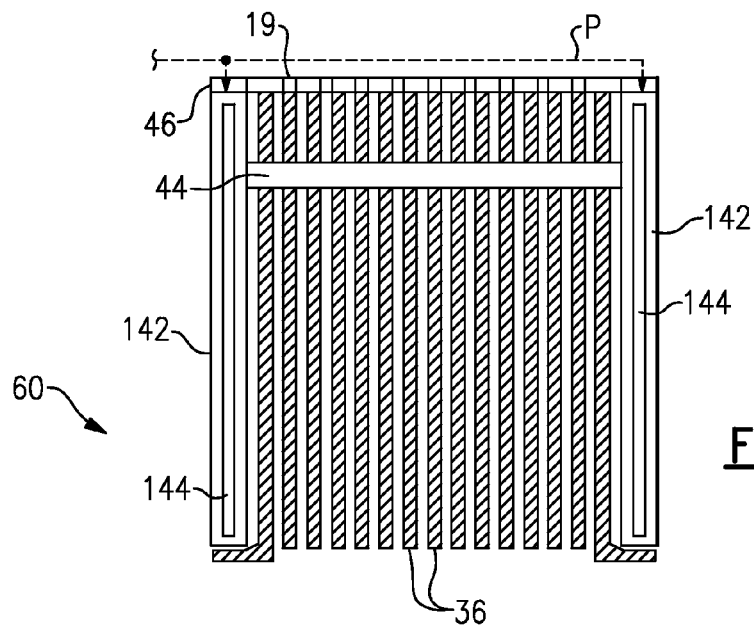
FIG. 4 shows an alternative embodiment.

FIG. 4 shows an alternative embodiment 60 wherein the forward and rear frames 142 are provided with cooling channels 144. Some method of providing cooling air to these channels is utilized. Generally, the cooling air can come from the flow path P, as shown in phantom. However, any method of providing cooling air to the channels can be utilized, and would be clear to a worker of ordinary skill in this art.

In the FIGS. 2 and 4 embodiments, the panels 36, 40, 41 (FIG. 2) 36 (FIG. 4) are not secured to the meter plate. Rather, the meter plate is secured to the frames 42 and 43, and the panels 36, 40, 41 (FIG. 2) 36 (FIG. 4) are secured on the hang rails 44. The hang rails 44 are secured to the frames 42 and 43.

Figure 5A:
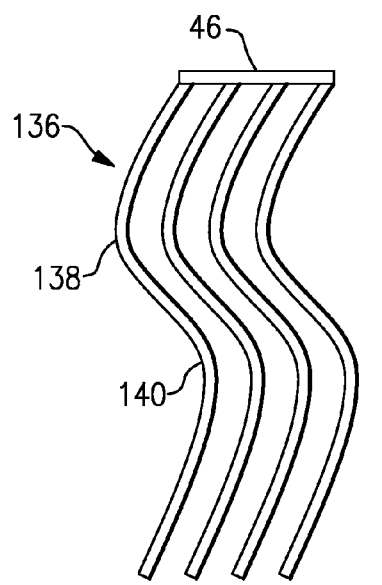
FIG. 5A shows an alternative embodiment.
Figure 5B:
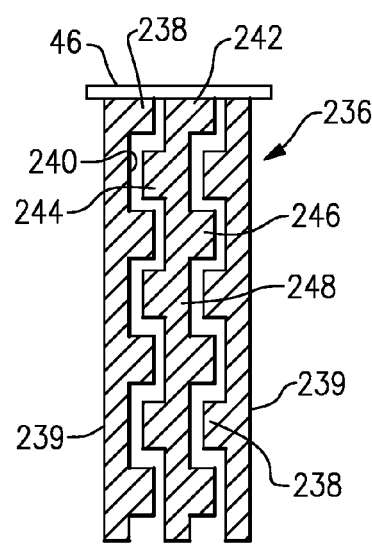
FIG. 5B shows an alternative embodiment.

FIGS. 5A and 5B show non-planar stacked panels. The panels 36, 40, 41 of FIG. 2, the panels 36 of FIG. 4, and the panels 336, 338 of FIG. 5C are all generally planar.

FIG. 5A shows an alternative 136, wherein the stacked panels have a generally sinusoidal design with alternating forward curves 138 and rearward curves 140. Other type curves can be utilized. As is clear, the curves on the adjacent panels are complementary.

FIG. 5B shows an alternative 236, wherein some of the panels have alternating castellations 238 and spaces 240. Central or intermediate panels 242 can have castellations 244 and 246 on opposed sides. A downstream panel 239 may be structured similarly to the upstream panel 239. These castellated panels 239, 242 may be utilized in groups of three, as illustrated, or there may be a plurality of central panels 242 having the opposed castellation, with the "one-sided" castellated panels 239 only utilized at the beginning and end.

Figure 5C:
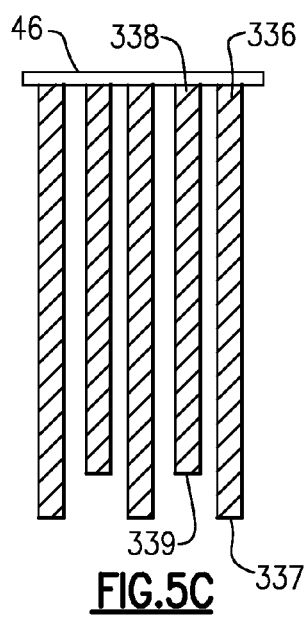
FIG. 5C shows an alternative embodiment.

FIG. 5C shows an alternative embodiment wherein the panels 338 and 336 have alternating stepped ends 337 and 339. With this arrangement, a serpentine flow path to resist leakage is provided.

Figure 6A:
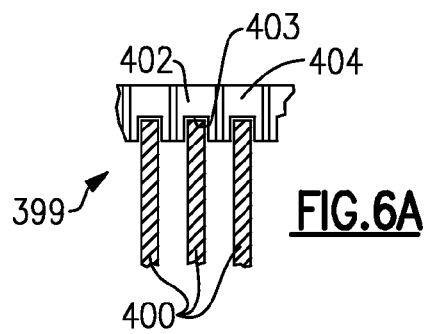
FIG. 6A shows another embodiment.
Figure 6B:
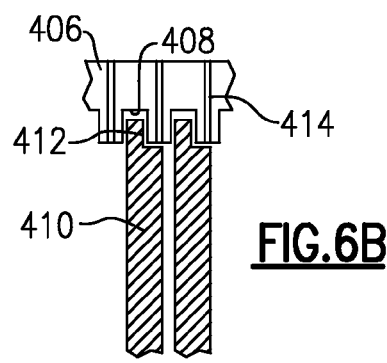
FIG. 6B shows yet another embodiment.

As shown in FIG. 6A, in one embodiment 399, the panels 400 extend upwardly into recesses 403 in the meter plate 402. Metering air openings 404 are formed as in the prior embodiments. A similar arrangement is shown in FIG. 6B, wherein panels 410 have an ear portion 412 extending upwardly into a recess 408 in a meter plate 406. Air openings 414 are provided.

The FIGS. 6A and 6B embodiments provide the additional benefit of positioning and separating the panels 400, 410 at a desired location. In addition, the recesses 403, 408 inhibit axial flow of any gases over the radially outer edges of the panels, to leak downstream.

Figure 7:
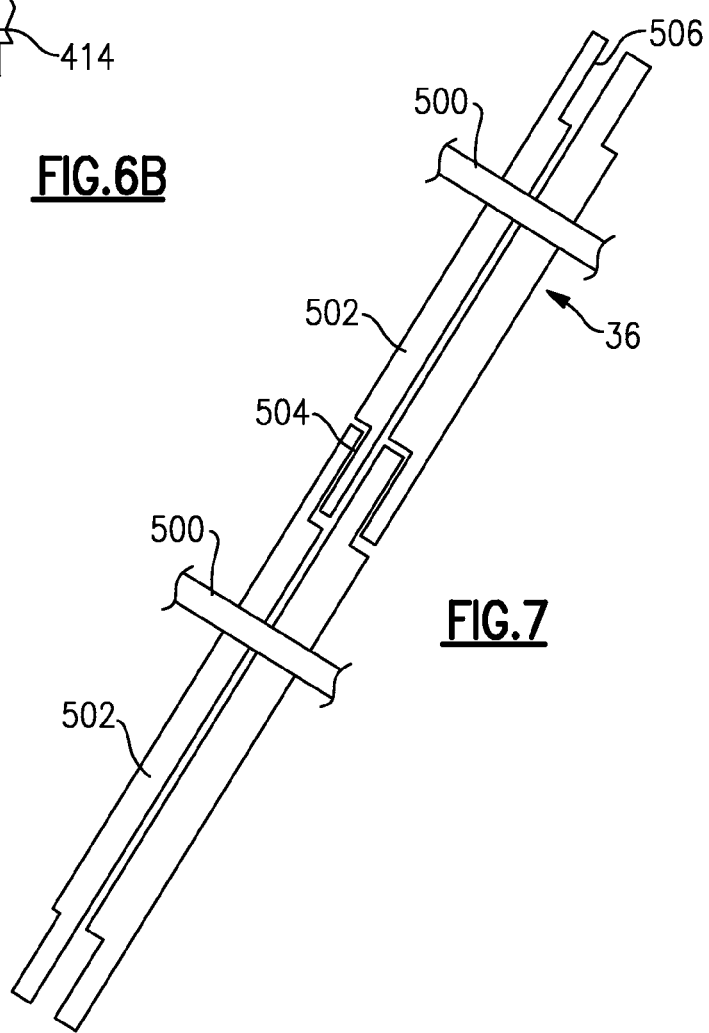
FIG. 7 shows yet another embodiment.

As mentioned above, the overall BOAS can be formed by a plurality of circumferentially spaced sections such as shown in FIG. 7. In the FIG. 7 embodiment, the sections 502 connect at circumferential edges having interlocking fingers 504 and 506 such that seals are provided at each circumferential end of each section 502. Again, hang rails 500 are shown.

Typical metallic BOAS arrangements create a pressure differential when separating the hot gas flow stream from secondary cooling air. The disclosed embodiments allow the use of materials having improved temperature or thermal response capabilities to create the end wall of the hot flow path without requiring the structural strength of metallic designs. In addition, the meter plate is subject to the pressure loads without bearing the requirements of the flow path (tip clearance, flow path temperatures, etc).

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A turbine section comprising:
   a turbine rotor for rotation about an axis and carrying turbine blades having a radially outer tip;
   a blade outer air seal positioned radially outwardly of said blade, said blade outer air seal having a plurality of stacked panels extending for at least a part circumferential extent, and from a radially outer location to a radially inner location, and said plurality of stacked panels being mounted together, said radially inner location being spaced from said tip;
   there being spaces between said plurality of stacked panels, and a cooling air supply for delivering cooling air into said spaces;
   a radially outer metering plate surrounds said plurality of stacked panels; and
   said panels extend upwardly into recesses in said radially outer metering plate.

2. The turbine section as set forth in claim 1, wherein there are a plurality of said blade outer air seals each extending only over a portion of a circumference about said axis, and there being circumferential edge structure at each circumference edge of each panel to interfit with an adjacent panel on an adjacent blade outer air seal to provide a seal.

3. The turbine section as set forth in claim 1, wherein said radially outer metering plate is provided with a plurality of holes to deliver air into said spaces between adjacent panels.

4. The turbine section as set forth in claim 1, wherein a forward frame and a rear frame are positioned at forward and rearward ends of said blade outer air seal, and are attached to said plurality of stacked panels.

5. A turbine section comprising:
   a turbine rotor for rotation about an axis and carrying turbine blades having a radially outer tip;
   a blade outer air seal positioned radially outwardly of said blade, said blade outer air seal having a plurality of stacked panels extending for at least a part circumferential extent, and from a radially outer location to a radially inner location, and said plurality of stacked panels being mounted together, said radially inner location being spaced from said tip;
   there being spaces between said plurality of stacked panels, and a cooling air supply for delivering cooling air into said spaces; and
   a forward frame and a rear frame are positioned at forward and rearward ends of said blade outer air seal, and are attached to said plurality of stacked panels, wherein cooling passages are formed in said forward and rear frames.

6. A blade outer air seal for a gas turbine engine comprising:
   a plurality of stacked panels extending for at least a part circumferential extent, and from a radially outer location to a radially inner location, and said plurality of stacked panels being mounted together;
   there being spaces between said plurality of stacked panels, and a cooling air supply for delivering cooling air into said spaces;
   a radially outer metering plate surrounds said plurality of stacked panels; and
   said panels extend upwardly into recesses in said radially outer metering plate.

7. The blade outer air seal as set forth in claim 6, wherein said plurality of stacked panels include openings which receive a support rail to help support said plurality of stacked panels.

8. The blade outer air seal as set forth in claim 6, wherein said radially outer metering plate is provided with a plurality of holes to deliver air into said spaces between adjacent panels.

9. The blade outer air seal as set forth in claim 6, wherein a forward frame and a rear frame are positioned at forward and rearward ends of said blade outer air seal, and are attached to said plurality of stacked panels.

10. The blade outer air seal as set forth in claim 9, wherein a forwardmost and a rearwardmost of said plurality of stacked panels have feet that extend radially inward and axially beyond ends of said forward and rear frames which are positioned closest to said plurality of stacked panels.

11. The blade outer air seal as set forth in claim 6, wherein said plurality of stacked panels are generally planar.

12. The blade outer air seal as set forth in claim 6, wherein said plurality of stacked panels extend radially inwardly for distinct amounts such that there is a stepped orientation at the radially inner location.

13. The blade outer air seal as set forth in claim 6, wherein said plurality of stacked panels are curved.

14. The blade outer air seal as set forth in claim 6, wherein said blade outer air seal extends only over a portion of a circumference of a gas turbine engine that will receive said blade outer air seal, and there being circumferential edge structure at each circumference edge of each panel to interfit with an adjacent panel on an adjacent blade outer air seal to provide a seal.

15. A blade outer air seal for a gas turbine engine comprising:
   a plurality of stacked panels extending for at least a part circumferential extent, and from a radially outer location to a radially inner location, and said plurality of stacked panels being mounted together;
   a forward frame and a rear frame are positioned at forward and rearward ends of said blade outer air seal, and are attached to said plurality of stacked panels; and
   cooling passages are formed in said forward and rear frames.

16. A blade outer air seal for a gas turbine engine comprising:
   a plurality of stacked panels extending for at least a part circumferential extent, and from a radially outer location to a radially inner location, and said plurality of stacked panels being mounted together;
   said plurality of stacked panels are castellated to have castellations extending into spaces in an opposed one of said plurality of stacked panels.

\* \* \* \* \*